(12) United States Patent
Tarasov et al.

(10) Patent No.: US 10,558,727 B2
(45) Date of Patent: Feb. 11, 2020

(54) SYSTEM AND METHOD FOR OPERATING A BROWSING APPLICATION

(71) Applicant: YANDEX EUROPE AG, Lucerne (CH)

(72) Inventors: Andrey Dmitrievich Tarasov, Altai region (RU); Konstantin Nikolaevich Ivanov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 314 days.

(21) Appl. No.: 15/686,447

(22) Filed: Aug. 25, 2017

(65) Prior Publication Data

US 2017/0351779 A1 Dec. 7, 2017

Related U.S. Application Data

(63) Continuation of application No. PCT/IB2015/053757, filed on May 21, 2015.

(30) Foreign Application Priority Data

Feb. 27, 2015 (RU) .................. 2015106800

(51) Int. Cl.
*G06F 17/30* (2006.01)
*G06F 7/00* (2006.01)
(Continued)

(52) U.S. Cl.
CPC ........ *G06F 16/9566* (2019.01); *G06F 16/954* (2019.01); *G06F 16/9535* (2019.01)

(58) Field of Classification Search
CPC . G06F 16/9566; G06F 16/9535; G06F 16/954
See application file for complete search history.

(56) References Cited

U.S. PATENT DOCUMENTS

2003/0217076 A1* 11/2003 Heptinstall ......... G06F 16/9577
                                                        707/999.107
2008/0097969 A1*  4/2008 Lee ..................... G06F 16/951
                                                        707/999.003
(Continued)

OTHER PUBLICATIONS

International Search Report and Written Opinion with regard to PCT/IB2015/053757 dated Oct. 15, 2015.

*Primary Examiner* — Kannan Shanmugasundaram
(74) *Attorney, Agent, or Firm* — BCF LLP (57) ABSTRACT

A method of generating additional information to be provided in a browser application of a client device comprising: receiving a request for displaying a first resource in the browser application, the request causing the client device to display the first resource in the browsing application, receiving an indication of a user interaction with the browsing application, responsive to the indication and prior to the user navigating away from the first resource: parsing the request to obtain at least one keyword, searching and retrieving, based on the at least one keyword, at least one entry of structured information based on the at least one keyword and being potentially relevant to the first resource, generating snippet information based on the at least one retrieved entry of structured information, transmitting and causing the client device the a to display a start page including the snippet information.

18 Claims, 4 Drawing Sheets

US 10,558,727 B2

Page 2

(51) Int. Cl.
*G06F 16/955* (2019.01)
*G06F 16/954* (2019.01)
*G06F 16/9535* (2019.01)
*G06F 17/00* (2019.01)

(56) References Cited

U.S. PATENT DOCUMENTS

| | | | |
|---|---|---|---|
| 2009/0019061 A1* | 1/2009 | Scannell, Jr. | G06F 16/9577 707/999.01 |
| 2009/0198667 A1* | 8/2009 | Groeneveld | G06F 16/345 707/999.005 |
| 2011/0035406 A1* | 2/2011 | Petrou | G06F 16/434 707/769 |
| 2011/0072033 A1 | 3/2011 | White et al. | |
| 2012/0151375 A1 | 6/2012 | Lin et al. | |
| 2012/0158294 A1 | 6/2012 | Clements | |
| 2012/0159294 A1 | 6/2012 | Gonsalves et al. | |
| 2013/0080937 A1* | 3/2013 | Sirpal | G06F 3/1438 715/761 |
| 2013/0125047 A1 | 5/2013 | Levin et al. | |
| 2013/0159923 A1 | 6/2013 | French et al. | |
| 2014/0108968 A1 | 4/2014 | Vishria | |
| 2014/0359510 A1 | 12/2014 | Graf et al. | |

* cited by examiner

SYSTEM AND METHOD FOR OPERATING A BROWSING APPLICATION

CROSS-REFERENCE

The present application is a continuation of PCT Application No. PCT/IB2015/053757, filed May 21, 2015, entitled "SYSTEM AND METHOD FOR OPERATING A BROWSING APPLICATION," which claims priority to Russian Patent Application No. 201506800, filed Feb. 27, 2015, entitled "SYSTEM AND METHOD FOR OPERATING A BROWSING APPLICATION," the entirety of both of which is incorporated herein.

FIELD

The present technology relates to web browsers in general and specifically to a system and method for operating a browsing application.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information, traffic information, games and entertainment related information. Users use a variety of client devices (desktop, laptop, notebook, smartphone, tablets and the like) to have access to information resources which can include rich content including text, images, audio, video, animation, and other multimedia content from such networks.

Generally speaking, a given user can access an information resource on the communications network through a number of mechanisms. The given user can access a particular information resource directly, either by launching a browser application such as Yandex browser, Windows Explorer, Chrome browser, Safari browser, Mozilla browser, Opera browser and the like and typing an address of the resource (typically an URL or Universal Resource Locator, such as www.webpage.com, corresponding to the network address for the resource) in a browser command interface; or by clicking a hyper-link to a resource in an e-mail or in another displayed resource. Alternatively, the given user may conduct a search using a search engine to locate a resource of interest. The latter is particularly suitable in those circumstances, where the given user knows a topic of interest, but does not know the exact address of the resource they are interested in.

Once a user has begun to view a first resource in a browser application, they can continue to move from resource to resource within the browser, either by clicking on hyperlinks; explicitly typing a new resource address; beginning a new search; or clicking on the browser application "back", "forward" or "home" buttons. Some browsers can also respond to voice commands enabling a user to provide a voice request which is then converted into either a navigation command or for example, a new search request.

It will be appreciated that when a given user is searching information about any of a company, place, product or media including movies, music or games, they may need to browse through a number of web pages before they arrive at a page of interest.

Modern web search engines have attempted to provide certain tools for the user to assist the user in sieving through the available information to more effectively arrive at a page of interest. For example, a Yandex browser application presents the user with several tools. The Yandex browser presents the user with a refinement tool, which refinement tool presents certain search refinement choices to the user. In for example a search for a game, the Yandex browser application may present the user with refinement choices of "game", "watch", "mp2", "book", "comics" and the like.

Alternatively or additionally, the Yandex browser application can present the user with a search results page (SERP) with search results ranked in the order of relevancy—from the most relevant web resource being on top, with the remainder of the web resources being responsive to the search query being ordered (or ranked) in the order of diminishing relevancy to the search request.

Additionally, some search engines can provide a snippet of information about a web resource—be it a textual summary or a snippet including an image and other related information to enable the user to determine if the particular web resource presented in the SERP indeed contains information that the given user is searching for. The user may then click the snippet (typically the snippet image) to follow a hyperlink associated with the snippet, whereby the browser application will request and display to the user the resource.

There is a significant body of prior art which attempts to improve a user's access to information as they attempt to locate required resources via a network:

US 2011/0072033 teaches a method of presenting web page suggestions related to (but not included in) search results or recently navigated to pages. These suggestions can be included in a drop-down menu. The suggestions are based on a search query.

US 2013/0159923 teaches a method of providing a search box in the tool bar, with a SERP that covers a first portion of the screen and shows a preview of a selected web page in a second portion of the screen. SERP can be provided in a drop down pane while navigating to sites in order to easily return to a populated SERP.

US 2013/0125047 teaches a method of presenting a browsing pane having search results presented; the browsing pane can overlap with a portion of a results pane.

US 2014/0108968 teaches a method of presenting information in a plurality of tiles (information blocks) that may be of interest to a user within a browser. This information may include websites visited or bookmarked by the user and/or may be related to a search term entered by the user.

In each of these cases, all additional information is based exclusively on a search request.

US 2012/0159294 teaches a method of including a secondary navigation bar, which may contain a drop down pane including information related to services of the web site (for example, shipping information for an online retail company) or notifications tailored to the user. Notifications are included in a pane. The secondary navigation bar is always active, so it is a part of interface of a website.

US 2012/0159294 offers some information related to the content of a page, but it is done only to one particular website. This application is about an e-shop, so for every product page, they offer predetermined information about delivery.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions.

According to a first broad aspect of the present technology, there is provided a method of generating additional information to be provided in a browser application of a client device, the method executable at a server, the method comprising: receiving, from the client device, a request for displaying a first resource in the browser application of the client device, the request including an indication of the first resource, the indication including at least a Uniform Resource Locator (URL) of the first resource and a title of the first resource, the request having been destined to a first resource server hosting the first resource, the request causing the client device to receive the first resource from the first resource server and to display the first resource in a displayable area of the browsing application of the client device, receiving, from the client device, an indication of a user interaction with a command interface of the browsing application, the user interaction being indicative of a user's intention to navigate away from the first resource, responsive to the indication of the user interaction with the command interface and prior to the user inputting a command into the command interface to navigate away from the first resource: parsing, by the server, at least the URL and the title of the first resource to obtain at least one keyword related to the first resource, searching, by the server, based on the at least one keyword, an index of structured information, the structured information having been previously indexed from at least one data source, retrieving, from the index of structured information, at least one entry of structured information based on the at least one keyword and being potentially relevant to the first resource, the at least one entry of structured information being associated with a suggested link to a respective resource, generating, by the server, at least one snippet of information based on the at least one retrieved entry of structured information, the at least one snippet of information including the suggested link to the respective resource, and transmitting to the client device the at least one snippet of information for causing the client device to display, in the displayable area of the browsing application of the client device, a start page instead of the first resource, the start page including the at least one snippet of information.

In some implementations, the parsing at least the URL and the title of the first resource to obtain at least one keyword related to the first resource further comprises obtaining at least one alias of the at least one keyword, and the retrieving the indication of structured information based on the at least one keyword is further based on the at least one alias of the at least one keyword.

In some implementations, the at least one entry of structured information is a plurality of entries of structured information, each entry being associated with a respective resource, and the at least one snippet of information is a plurality of snippets of information, each snippet of information based on a respective entry of the plurality of entries of structured information.

In some implementations, a number of snippets of information transmitted to the client device is predetermined.

In some implementations, the structured information is organized in fields, and the generating the at least one snippet of information further comprises populating fields of the at least one snippet of information using fields of structured information stored in the index.

In some implementations, the fields of the structured information include at least one of: a company, a place, a product and a media, the media being one of movies, music and games.

In some implementations, the at least one data source is a plurality of data sources.

In some implementations, the structured information in the index of structured information has been indexed further based on information available from web resources of the plurality of data sources associated with the first resource.

In some implementations, the index of structured information has been indexed based on historical information of past users having accessed the first resource.

In some implementations, the historical information about past users having accessed the first resource comprises click through information, the click through information representative of resources selected by the past users in response to search queries submitted to a search engine by the past users.

In some implementations, the indication of the user interaction with the browser application is a user selection of an entry field of the browsing application.

In some implementations, the user interaction with the entry field of the browser application is the entry field obtaining focus when a location of a pointer coincides with the entry field.

With the present technology, a navigation pane, for example, in the form of a start page, appears when a user indicates they wish to navigate away from a displayed resource, such as a web page, through interaction with a command interface of a browsing application. It will be appreciated that displaying a resource can include rendering content for a resource in any fashion including playing an audio file or a video file. The navigation pane includes information derived from the URL and possibly the title of the resource which the user intends to leave (navigate away from), the derived information possibly being of interest to the user.

The present technology helps users to get additional information related to a resource they are viewing in a browser. The URL and possibly the title of a resource are sent to a content server that searches for an indication of any one of a group including: a company, place, product or media including movies, music or games, in this information. Then, if any such indication is found, the content server finds additional information for this resource and transfers it to the browser. The browser then gets an information block with this additional information and this is displayed for the user.

This technology offers answers to questions a user might potentially ask and that are relevant to the user at a particular moment of time. Thus, a user gets additional information about a resource, for example, reviews about a shop or restaurant, prices, location or time when they can watch movie in the cinema or buy tickets, as they are formulating their request for a subsequent resource by for example, typing a resource address (URL) or a new search request.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand.

Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
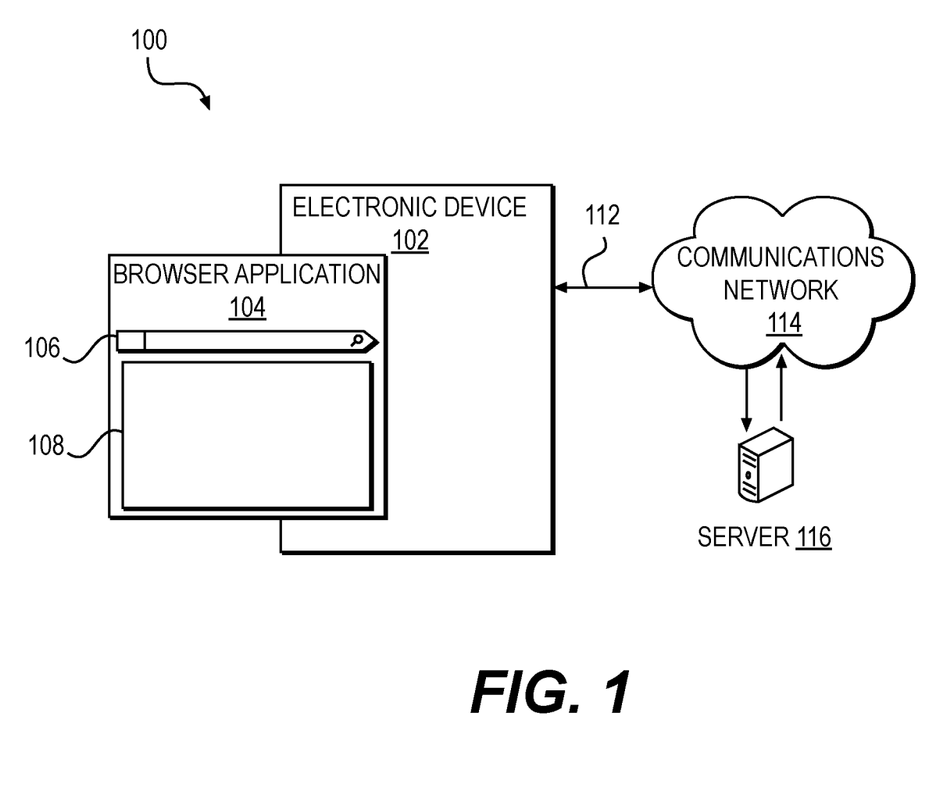
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 102 is known in the art and, as such, will not be described here at much length. Suffice it to say that the electronic device 102 comprises a user input interface (such as a microphone, keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over the communications network 114; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 102 comprises hardware and/or software and/or firmware (or a combination thereof), as is known in the art, to execute a browser application 104. Generally speaking, the purpose of the browser application 104 is to enable the user (not depicted) to access one or more web resources. The browser application 104 has a command interface 106 and the browsing interface 108, both of which are empty as the user has not yet started inputting any web resource addresses or any queries.

The command interface 106 can be implemented as an "omnibox" field—an entry field incorporating the functionality of a field for entering URLs and a field for entering search queries for the search engine to search. In other words, within the depicted embodiment, the user can use the command interface 106 for both entering search queries and URLs. The browsing interface 108 is for displaying to the user either: (i) a web resource associated with the URL entered into the command interface 106; (ii) a search results page (SERP) generated in response to the search query entered in the command interface 106; or (iii) any other form of navigation pane.

The electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the electronic device 102 is implemented. Recalling that the electronic device 102 is implemented, in this example, as a laptop, the communication link 112 can be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementation details for the electronic device 102, the communication link 112 and the communications network 114. As such, by no means, examples provided herein above are meant to limit the scope of the present technology.

Also coupled to the communications network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

The implementation of the server 116 is well known. However, briefly speaking, the server 116 comprises a communication interface (not depicted) structured and configured to communicate with various entities (such as the electronic device 102, for example and other devices potentially coupled to the communications network 114) via the communications network 114. The server 116 further comprises at least one computer processor (not depicted) operationally connected with the communication interface and structured and configured to execute various processes to be described herein.

In some embodiments of the present technology, the server 116 can be operated by an operator of a search engine, such as the operator of the Yandex™ search engine available at www.yandex.ru. In alternative embodiments, the server 116 can be operated by any other suitable entity, such as another search engine operator and the like.

In alternative embodiments, the server 116 can be operated by the same entity that has provided the afore-described browser application 104. In alternative embodiments, the server 116 can be operated by an entity different from the one who has provided the afore-mentioned browser application 104.

How the browser application 104 is implemented is not particularly limited. One example of the browser application 104 may be embodied as a Yandex™ browser. The Yandex™ browser in common with other browser applications provides a navigation pane, sometimes referred to as a start page, being the page first loaded when the browser is started or a new window or tab page is opened in a browser. Navigation panes such as start pages are typically distinct from a browser "home page", which is the page a browser displays in response to a user selecting/clicking a home button.

Embodiments of the present technology are based on the realisation that while a user browses between various resources with a browser application 104 using a number of mechanisms, there exists an opportunity to present the user with useful information in particular when the user indicates that they are about to navigate away from a resource through interaction with the command interface 106. This interaction can comprise any interaction including: the command interface 106 obtaining focus when a location of a pointer (not shown) coincides with the screen area occupied by the command interface 106; the user actually selecting the command interface 106 by selecting, for example, by left-clicking or right-clicking, anywhere within the command interface 106; the user swiping the URL for the current resource displayed within the command interface 106 and so selecting the URL; or indeed the user beginning to type within the command interface 106—either to signal a new URL or a new search query.

Indeed in some embodiments of the technology, the command interface 106 can be voice driven. So for example, the interaction might comprise a user speaking a voice request or indicating that they are about to provide a voice request, using a voice activation command, for example, "OK Google!", "Hey, Siri!" or equivalent for other platforms. Such a voice request can be interpreted as interaction with the command interface indicating that the user is providing a command indicating that they wish to navigate away from the page.

The indication that a user intends leaving a resource can be received by the user indicating their desire via any user interface, such as a mouse, a key board, a touch screen and the like and, as explained above, through voice interaction. Alternatively, the desire to navigate away from a resource being browsed could be indicated by the user entering a pre-determined key stroke pattern (by actuating a combination of keys), a combination of a key and a mouse action, a pre-determined action on a touch screen or the like.

In any case, once the user indicates they wish to navigate away from the resource; the browser application 104 immediately swaps to display a start page navigation pane. Thus, a start page is not only loaded when the browser is started or when a new window or tab page is opened, but also in response to certain user interaction with a browsing interface 108 displaying a resource, for example, a web page. As will be explained below, the start page which loads in response to user interaction is not necessarily the same as the default start page loaded when the browser is started or when a new window or tab page is opened, particularly because at least some of the content of the start page comprises content specific to the content of the resource being displayed at the time of user interaction indicating the user wished to navigate away from the resource being displayed.

Figure 2:
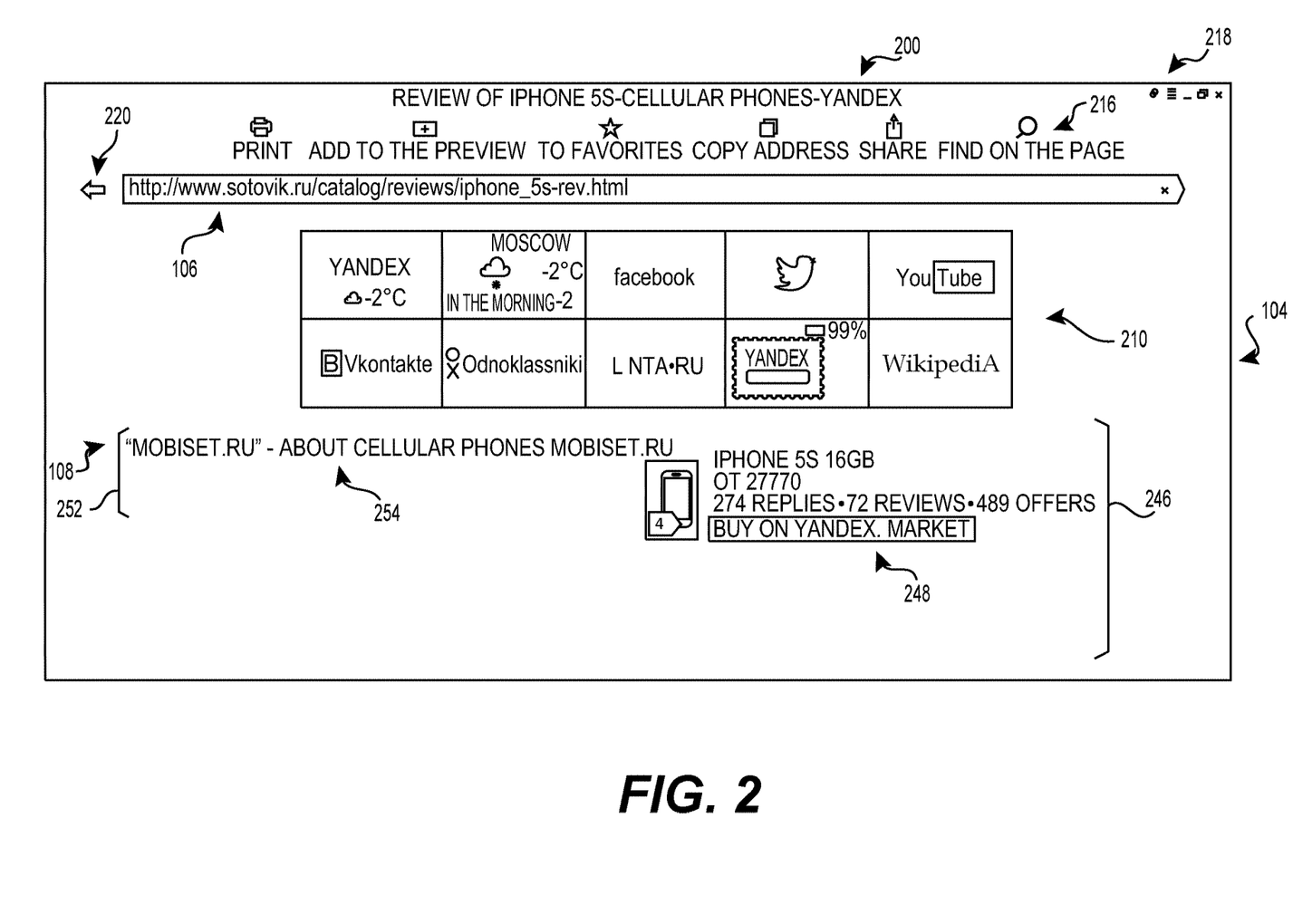
FIG. 2 depicts a screen shot 200, which illustrates one non-limiting embodiment of a browser application 104 executed on an electronic device 102 of the system 100 of FIG. 1.

An example screenshot 200 for one such start page is depicted with reference to FIG. 2. In this case, the user has been viewing a web page at the following URL http:///www.sotoviksu/catalog/reviews/iPhone_5S-rev.html as indicated by the URL remaining within the command interface 106 where it has been highlighted as selected by the user.

As previously discussed, the command interface 106 is implemented as an omnibox and the remainder of the browser window comprises the browsing interface 108 for the start page. Thus, if the user were to commence and/or continue to type within the command interface 106 while the start page is displayed and then to press return or the like, to signal they have entered a command, the browser application 104 would respond either by displaying the resource at an address input by the user; or displaying search results for a search query input by the user—the latter being employed if a correct URL is not entered.

Within the embodiment depicted in FIG. 2, the browsing interface 108 for the start page comprises a control panel 210, the control panel 210 having shortcuts and/or notifications from a number of services. Within the specific example, the services include Yandex™ weather, Moscow weather service, Facebook™, Twitter™, Youtube™, Vkontakte™, Odnoklassniki™, news portal www.lenta.ru, Yandex.Mail™, and Wikipedia. Needless to say that the number and the actual services can vary in the alternative embodiments of the present technology.

Within the specific example, the content of the control panel 210 generated by the browser application 104 can be based on the recently visited web resources and/or services (for generating notifications) to which the user is logged into (or otherwise is authenticated with). In some embodiments, some or all of the content of the control panel 210 can be updated in real or near-real time. For example, the notification from the Odnoklassniki social network provided in control panel 210 can be updated from time to time with the new messages, as they are arrive at the respective server destined for the user of the electronic device 102.

It should be noted that the control panel 210 can be generated in any other manner. It should be also noted that the appearance of the control panel 210 can be customized by the user. To that end, control panel setting buttons (not shown) can be provided as disclosed in cross-referenced PCT Application No. PCT/IB2014/065216.

Finally, it will be appreciated that the control panel 210 can be common to any start page displayed by the browser application 104. Thus, while not essential, it can be useful to display the control panel 210 towards the top of the browsing interface immediately adjacent the command interface 106. This means that as new start pages are produced in response to various user interactions, the degree of movement of user interface components within the browser application as a whole is minimized.

Briefly, to complete the description of the instance of start page for the browser application 104 of FIG. 2, the browser application 104 comprises a browser control buttons panel 218. The browser control buttons panel 218 includes the well-known button for minimizing the browser screen, maximizing the browser screen and closing the browser screen (all not numbered). The browser application 104 optionally includes a conventionally-known back button 220, the back button 220 for allowing the user to go back to previously viewed web resources. Finally, a row a command buttons 216 can also be provided, in this case above the command interface, enabling the user to, from left-to-right: print, add the current URL to the control panel 210 as disclosed in PCT Application No. PCT/IB2014/065216, add the current URL to the user's bookmarks; copy the current URL to the clipboard; share the URL through any number of network or messaging services; or search for some text within the current navigation pane.

Again, the browser control buttons panel 218 and the command buttons 216 are provided in a common location across all start pages displayed by the browser application 104.

It should be expressly noted that the various details of the implementation of the browser application 104 can be varied or omitted without affecting the scope of implementation of the embodiments of the present technology. It should be also expressly understood that embodiments of the present technology are not limited to the browser environment depicted with the illustration of the browser application 104. Teachings presented herein can be equally applied to any other commercially available or proprietary browsers. As such, a non-limiting list of the browsers where embodiments of the present technology can be implemented include: Yandex™ browser, Windows Explorer, Chrome browser, Safari browser, Mozilla browser, Opera browser and the like.

The control panel 210 thus occupies a first portion of the browsing interface 108 for the start page. The information for the control panel 210 can be readily produced and this can be cached locally within the electronic device 102 for ready retrieval by the browser application 104 when required.

In a second portion of the browsing interface 108, there is provided a content-specific tool bar 246. The content specific tool bar 246 is divided into: an information snippet 248 dependent on the content of browsed resource which the user has indicated they wish to leave and displayed within a first portion of the content-specific tool bar 246; as well as a set of one or more links 252, again dependent on the content of browsed resource which the user has indicated they wish to leave and displayed within a second portion of the content-specific tool bar 246.

Snippets such as the snippet 248 are becoming a more common form of representing results in a SERP. These rely on producers of content such as HTML pages marking up their content according to well defined schema. Some examples of such schema are available on schema.org and include schema defining properties for a variety of types including common types such as:
- Creative works including: Book, Movie, MusicRecording, Recipe, TVSeries . . .
- Embedded non-text objects: AudioObject, ImageObject, VideoObject
- Event
- Health and medical types
- Organization
- Person
- Place, LocalBusiness, Restaurant . . .
- Product, Offer, AggregateOffer
- Review, AggregateRating
- Action When content from website or webpage marked up in accordance with any given schema is provided to the browser application 104, the content can be displayed by the browser application 104 in a number of different ways so that instead of just providing a simple link to the website or webpage as in a conventional SERP, the browser application 104 can display a variety of specific information for a website or web page including direct connections to specific pages or sections of the website. Indeed snippets based on appropriately marked-up content can also be displayed by the browser application 104 with interactive fields enabling a user to fill in information within the snippet, for example, to book or check-in for a flight, book a cinema ticket, make an appointment or submit an offer for a product.

Figure 3:
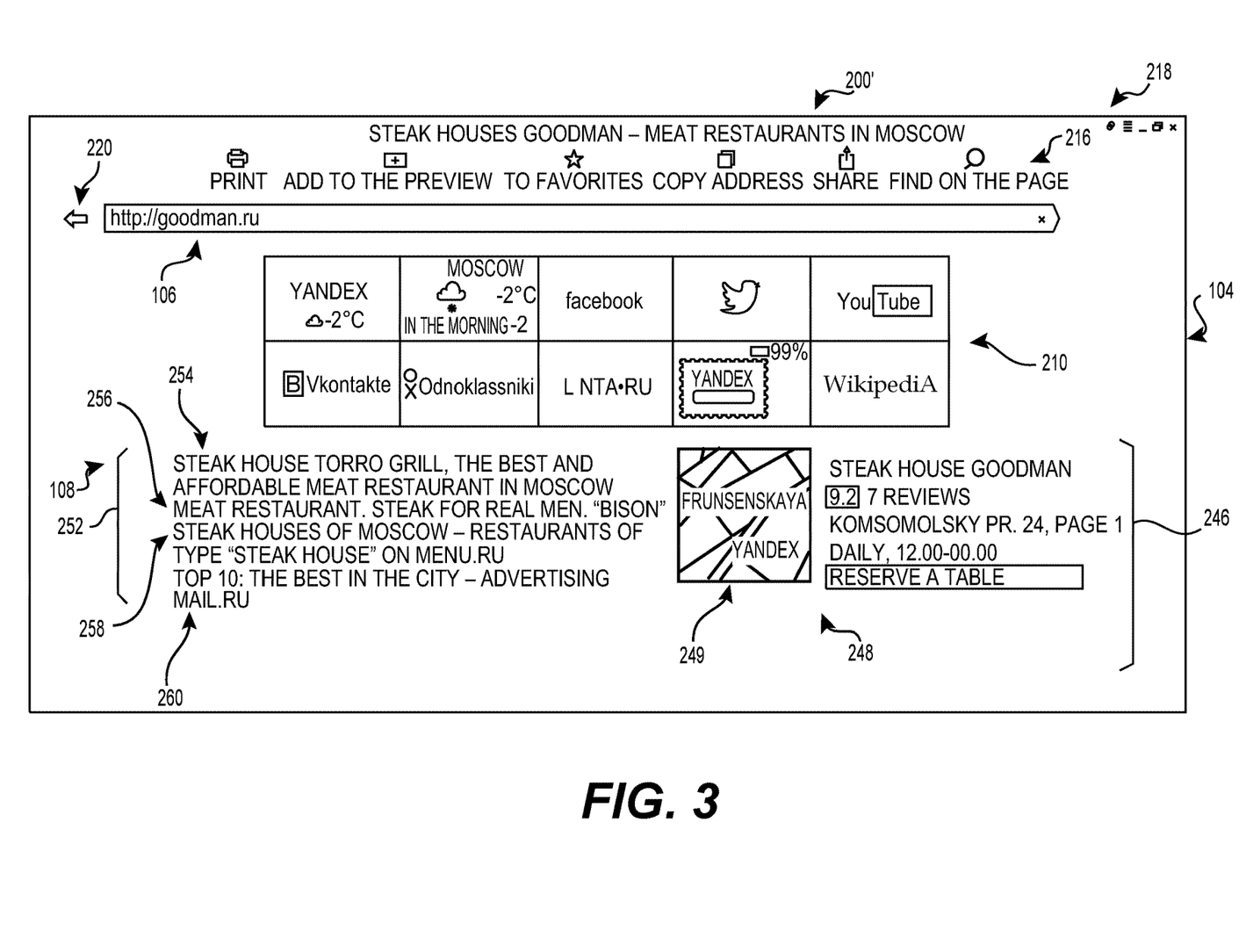
FIG. 3 depicts a second screen shot 200', which illustrates one non-limiting embodiment of a browser application 104 executed on an electronic device 102 of the system 100 of FIG. 1.

In the examples of FIGS. 2 and 3, the content-specific tool bar 246 is divided into left and right portions for displaying a snippet 248 and links 252 respectively, but it will be seen that these could equally be displayed one on top of the other. Regardless, it is advantageous that these portions (i.e. the snippet 248 and the links 252) of the content-specific tool bar 246 are displayed in common locations within any start pages in which they are displayed.

The problem faced in producing the content-specific tool bar 246 and particularly snippets 248 for display within the content-specific tool bar 246 is that information from the resource being browsed needs to be provided to a service running on a remote server such as the server 116 and the service needs to analyse the information and respond with the required information, ideally within the least time between when a user might begin to view the resource and when they may begin to indicate that they wish to browse away from that resource by interacting with the command interface 106. Otherwise, the information for the content-specific tool bar 246 might not be available until after a user has completed providing their new command within the command interface 106 and so a new resource should be displayed rather than the start page. Even if the delay in providing and displaying the start page were not quite as long as the user required to input a command in the command interface 106, the start page including the content-specific tool bar 246 might still not be displayed for long enough for the user to assimilate its information.

In this regard, it will be appreciated that it could take some time both to download large resources such as extensive web pages, to upload the whole content of the web page to the server 116, for the server 116 to analyze that content to determine if the web page relates to some specific subject and then to produce the content for that subject before providing the content to the browser application 104 running on the electronic device 102. Such an approach might therefore not provide acceptable results or responsiveness for end users. It will also be appreciated that such an approach would be extremely burdensome on a server which could be required to service simultaneous requests from hundreds of thousands of users.

In one embodiment of the technology, the browser application 104 is responsive to a user interacting with the command interface 106 to send a request to a content server, such as the server 116, referred to as proxyserver.com. (The content server 116 is distinct from the server hosting the resource being browsed and which the user may wish to leave.) The request is made in a following form:

http://proxyserver.com/page-ins-data?url=< . . . >&title=< . . . >&lang=< . . . >&ll=< . . . > where
- url is the URL of the resource being browsed and which the user has indicated they wish to navigate away from through interaction with the command interface 106;
- title is the title extracted from the resource being browsed;
- lang is the language of browser; and
- ll is the geolocation (if available) of the electronic device 102 running the browser application 104.

Of course variants of this request format could also be employed both in terms of the grammar used, but also in terms of the variety of information provided to the server 116.

The server 116 can have access, not alone to a conventional type search engine allowing the server to request the search engine to perform a conventional type search resulting in a ranked list of links 252 which can be used as described below, but also to a number of data sources (not shown) with reliably indexed and structured content for a variety of different content types. For example, data sources such as kinopoisk.ru and imdb.com provide structured information for movies and actors. Yandex.YellowPages provides structured information for companies. Sources such as Yandex.Market provide information for products on sale.

All these data sources can be pre-indexed so that they can be searched rapidly. The indices can include a plurality of keywords, each with one or more aliases and for each keyword and its aliases, a link to structured piece of content within any of the data sources accessible to the server 116.

On receiving the request, the server 116 searches the URL and title fields for any substrings corresponding to keywords or their aliases within the data source indices. If the server 116 finds a substring that matches a keyword or one of its aliases, it can retrieve information from the corresponding link to the data source. If a number of matches are found, these can be limited (to a pre-determined number of hits) according to any location information or any further information provided in the request.

Having retrieved the information for the index entries matching the request information, the server generates snippet information for transmission to the browser application 104.

One example of snippet information can take the following form:

---

{"market":{
"name":"iPhone 5S 16Gb",
"mainPhoto":{"height":585,"url":"http://mdata.yandex.net/i?path=b0910230234_img_i d2130334858748450706.jpg","width":290},
"rating":4,
"prices":{"min":"21979","max":"43000","curName":"руб."},
"link":"http://market.yandex.ru/model.xml?modelid=10495456\u0026hid=91491",
"offersCount":1032,
"reviewsCount":193,
"reviews":"http://market.yandex.ru/model-reviews.xml?hid=91491\u0026modelid=10495456",
"comments": "http://market.yandex.ru/10495456/reviews"
}},

---

In the above example, an entry for an "iPhone 5S" which is on sale has been retrieved from the Yandex.Market data source, along with information and links for each of the fields: mainPhoto, rating, prices, link, offersCount; reviewsCount; reviews; and comments relating to the product.

Another example of snippet information can take the following form:

---

{"organization":{
"name":"Lenta.ru",
"url":"http://lenta.ru",
"address":"Варш аВ с К ое Ш оссе, 9, сТ р. 1",
"hours":"круглосуточно",
"id":"1020044470",
"coords":{"lat":"55.699081","lng":"37.624355"},
"phones":[{"country":"7","formatted":"+7 (495) 785-00-15","info":null,"number":"7850015","prefix":"495","type":"phone"}],
"rating":{"score":"9.8"},
"reviews":{"count":"9"},
"timezone":-240,
"attribution":{"name":"Яндекс","url":"http://www.yandex.ru"}
}}

---

Here, information relating to a company Lenta.ru has been retrieved along with address, contact, rating and review information for the company.

The server 116 can return snippet information for one or more snippets to the browser application 104 and these can be combined within the response to the browser application 104 request in any suitable fashion. When the browser application 104 receives this response from the server 116, and if the response contains snippet information for more than the number of snippets which are to be displayed in the start page, the browser application 104 prioritizes the snippet information results according to given criteria. These criteria can be set by a user or they can be generated either explicitly or adaptively by the browser application 104 in accordance with user behavior.

Depending on the space available within the content-specific tool bar 246, the browser application selects one or more of the snippets and then displays the one or more snippets accordingly within the content-specific tool bar 246.

In the example of FIG. 2 a single snippet 248 for an iPhone 5S 16 Gb is displayed within the browsing interface 108. (The information values for this displayed snippet are not the same as for the snippet described above.)

In the example snapshot 200' of FIG. 3, the user has been browsing the web page http://goodman.ru. In this case, the server 116 has recognized within a mapping data source that there is snippet information relating to the Goodman steak house in Moscow and returned structured data for this restaurant accordingly.

The snippet information is displayed within the content-specific tool bar 246 as in the example of FIG. 2, but in this case, instead of the browser application 104 jumping to display a new web page in response to the user clicking the map image 249 for the snippet 248, the browser application 104 can launch an instance of a mapping application centered on the location coordinates for the restaurant.

It will be seen from the examples provided in FIGS. 2 and 3 that content based snippets can provide a user with additional information about the content of resource which they had been viewing and had indicated they intended to leave.

Many different types of snippets can be provided including snippets providing company information, product information—either for a product or even an individual instance of the product as in the example of FIG. 2, movie snippets or music snippets or game snippets.

Where the server 116 detects that a URL and/or title for a resource contain a reference to a place, a snippet comprising a review or location of the place can be provided.

Where the server 116 detects that a URL and/or title for a resource contain a reference to a product, a snippet including prices for product can be provided.

The technology is based on the insight that it could be useful to provide a user with information relating to a resource without the user explicitly requesting a search for that resource in a non-intrusive fashion.

As long as the user is not restricted from the interaction with the command interface 106 and can continue to type either the new URL or search request, the browser application 104 can use this time to assemble and display the start page including the control panel 210 and the content-specific tool bar 246. Indeed, these can be displayed as they become available with the control panel 210 being displayed first and the snippet 248 following after.

In other embodiments of the present technology, in order to anticipate the user wishing to navigate away from a resource and so more quickly provide the start page such as shown in FIGS. 2 and 3, the browser application 104 incorporates a proxy (not shown). Each browser request for a resource, for example, a HTTP request, is intercepted by the proxy and then re-sent by the proxy to a remote server which hosts the requested resource so that the reply from the remote server is received by the proxy.

The proxy can operate in a number of ways. In a first approach, as well as re-sending the original request to the remote server which hosts the requested resource, the proxy also provides the URL within the original request to a server such as the server 116 in a request of the form described above, but without the title field. The URL is analyzed by the server 116 as described above and the snippet information is provided by the server 116 to the proxy for use in response to a user indication that after receiving the resource information from the remote server via the proxy, the user wishes to navigate away from the resource. Now the start pane information is immediately available to the browser application 104 for display as shown in FIGS. 2 and 3.

In a still further alternative approach, the proxy awaits the reply to the original request from the remote server which hosts the requested resource and then parses the returned content to identify a title field within the content. The proxy can now provide a request of the form described above including both the URL and title information for the resource to the server 116 before receiving the start pane information for display when required as shown in FIGS. 2 and 3.

It is appreciated that in some cases, multiple HTTP requests result from a single navigation request from a user and indeed the final URL associated with the resource being displayed may not correspond with the original URL. In this case, the browsing application 104 and/or its proxy can apply rules to determine which URL needs to be provided to the content server 116, so that the most appropriate results are returned by the server 116.

Turning back to FIG. 2, as well as the snippet information 248, the server 116 can also provide a list of suggested links 252 for display within the start page, the list of suggested links enabling the user to select one or more suggested links.

In the example of FIG. 2, the list of suggested links 252 comprises only a single link 254. However, in the example of FIG. 3, the list of suggested links 252 comprises a first suggested link 254, a second suggested link 256, a third suggested link 258 and a fourth suggested link 260. It should be noted that the number of the suggested links within the list of suggested links 252 within alternative embodiments of the present technology can vary.

It is noted that in each example, the content of each of the suggested links 252 has been generated based on the content of the resource which the user has indicated they wish to leave. It is also noted that each of the list of the suggested links 252 allows the user to perform at least one content-specific action—in this case the action including browsing content related to the content of the resource the user has indicated they wish to leave. It is noted that the user may not even be aware that they may be interested in the content of the web resources links to which are provided within the list of suggested links 252. In other words, the content of the list of suggested links 252 can be generated and presented to the user of the electronic device 102 without the user expressly indicating her desire to see suggested links or even being aware of the existence of such related material.

How the content of the list of suggested links 252 is generated will now be described in greater detail.

In some embodiments of the present technology, the content of the list of suggested links 252 is compiled based on the historical information about other users' searches that have accessed the same web resource as the user has indicated they wish to leave. Recalling that the server 116 can be under the control of a search engine entity, the server 116 can maintain a log (not depicted) of browsed content. In some implementations, upon user consent and authorization, the server 116 maintains a log (not depicted) with content searched for and clicked through by a particular user (for example, storing this information in associated with a user profile registered with the search engine). Alternatively, the server 116 can maintain an anonymized log (not depicted) of various user search history and click through history. Hence, the server 116 can become aware of the historical searching and/or browsing patterns associated with other users searching for or browsing the content of the resource the user has indicated they wish to leave.

Based on the maintained logs (not depicted) the server 116 can determine certain patterns of search and browsing activity. For example, using machine-learning algorithms, the server 116 can determine the following search pattern: users searching for "purchase air cheap tickets online" also search for "travel insurance policy, cheap". By the same token, the server can determine the following search pattern: users searching for "Siamese kittens" also search for "newest model of BMW". It should be noted that based on the log information a number of additional patterns can be developed and ranked based on their relevancy.

By applying these various learned historical search patterns, the server 116 can access the logs (not depicted) and appreciate, based on other users' past searches, what other related (or unrelated for that matter) information other users searching for a given subject have also searched for.

In some embodiments of the present technology, rather than simply looking for related searches, the server 116 can further analyze click through information. Click through information represents information about which search results from a plurality of search results presented to the user in response to a particular search query, the user has selected. In some embodiments, the server 116 can rank the related resources presented in the list of suggested links 252. The ranking can be executed based on historical information associated with other users browsing for the content of the browsed page 240. Alternatively or additionally, the server 116 can take into account personalized features known about the user of the electronic device 102.

In alternative embodiments, rather than looking for the most clicked through search result information, the server 116 can determine suggested links based on "related resources". In still further alternative embodiments of the present technology, the content of the list of suggested links 252 can be generated based on the information available from the web resource associated with the resource which the user intends leaving. For example, Wikipedia articles often contain a section on related articles in the same category. The server 116 can receive an indication of such other articles in the same category. In some embodiments of the present technology, the server 116 can further apply its logic and routines (such as those described above based on past search patterns) to retrieve the most relevant or the most popular from those listed in the related category by the web resource associated with the resource which the user intends leaving.

Figure 4:
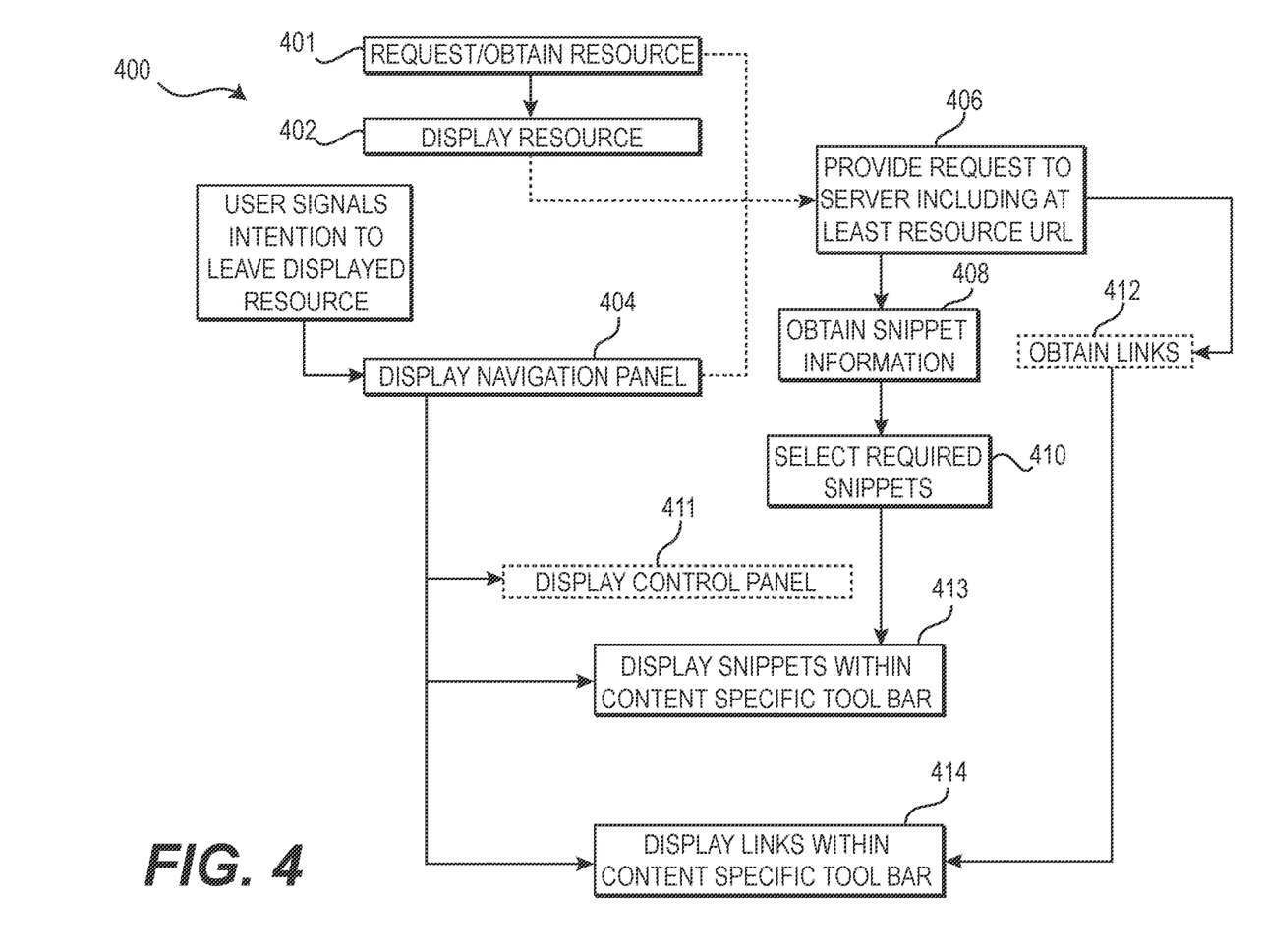
FIG. 4 depicts a flow chart of a method 400, the method 400 being implemented in accordance with a non-limiting embodiment of the present technology.

Given the architecture of the system 100 described with reference to FIG. 1 and the examples provided with reference to FIGS. 2 and 3, it is possible to execute a method for operating a browsing application. With reference to FIG. 4, there is depicted a method 400, the method 400 being implemented in accordance with a non-limiting embodiment of the present technology.

The method 400 starts at step 401 with a user requesting and obtaining a resource to be displayed by the browsing application 104. As discussed a user can request a resource directly, either by launching the browser application 104 and typing an address of the resource in the browser command interface 106; by clicking a hyper-link to a resource in an e-mail or in another displayed resource; or conducting a search using a search engine to locate a resource of interest.

In step 402 the electronic device 102 displays the resource substantially in an entirety of the browsing interface 108 of the browser application 104 in an otherwise conventional fashion. It will be appreciated that displaying a resource can include rendering content for a resource in any fashion including playing an audio file or a video file.

In Step 404, responsive to receiving, through user interaction with the command interface 106 of the browsing application 104, an indication that the user intends leaving a resource being displayed, the browsing application 104 displays a navigation pane comprising at least content-specific tool bar 246.

In Step 411 which can be performed at any time after the navigation pane is displayed, a control panel 210 such as the panel described in relation to FIGS. 2 and 3 can be displayed within the navigation pane.

Separately, step 406 can be performed either: before Step 404 at the time the resource which the user intends leaving was being requested; before Step 404 when the content for the resource was being received; before Step 404 when the resource is being displayed; or only in response to Step 404 with the user indicating they wish to navigate away from the resource. In any case, in Step 406, the browser application 104 provides a request to a server 116 including at least the URL for the resource and possibly the title of the resource, if available.

In Step 408, the browser application 104 receives from the server 116 information for one or more snippets which relate to at least one sub-string within the URL provided to the server 116 and possibly a sub-string within the title if this has been provided to the server 116.

In Step 410, the browser application 104 determines which of the snippets will be displayed within the content-specific tool bar 246.

In Step 412, which is optional, the browser application 104 also receives from the server 116 a set of one or more links which relate to at least one sub-string within the URL provided to the server 116 and possibly a sub-string within the title if this has been provided to the server 116.

In Step 413, the browser application 104 displays the snippets within the content specific tool bar 246. This step can either precede or succeed Step 412.

In Step 414, when available, the browser application 104 displays the set of links 252 within the content specific tool bar 246. This step can either precede or succeed Step 413.

As has been alluded to above, the indication of the user desire to navigate away from the display of the resource is not particularly limited and can be implemented as described above, including a combination of the various examples provided above, as well as other alternative means conceivable to those of skill in the art, who have appreciated teachings of embodiments of the present technology.

It will be appreciated that many further variants of the above described embodiments are possible.

For example, in some embodiments, if the user does not interact with the start page within a given period of time, the browser application 104 can revert to displaying the resource which the user had indicated they wished to leave through their interaction with the command interface 106.

It will be noted that where a back button 220 is provided within the start page, the user can explicitly select the button 220 to have the browsing application 104 revert back to the page which the user had indicated they wished to navigate away from through their interaction with the command interface 106.

It will also be noted the start page produced by the browsing application 104 in accordance with the above described embodiments can be included in the browser history and so retrieved for review by the user at any later time. Equally, if a user either selects one of the links 254,256,258,260 from the list of links 252 or the snippet 248 displayed within the content-specific tool bar 246, the user can always select the back button 220 when viewing the subsequent linked resource to return to the start page.

It will be appreciated that the start page could also include a reduced size display of the page which the user had indicated they wished to navigate away from as in PCT Application no. PCT/IB2014/06521.

Examples have been described in terms of general purpose browser applications displaying web pages. Embodiments could also be implemented for browsers specifically dedicated to enable users to browse through particular types of resources such as videos or music.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating additional information to be provided in a browser application of a client device, the method executable at a server, the method comprising:
   receiving, from the client device, a request for displaying a first resource in the browser application of the client device, the request including an indication of the first resource, the indication including at least a Uniform Resource Locator (URL) of the first resource and a title of the first resource, the request having been destined to a first resource server hosting the first resource, the request causing the client device to receive the first resource from the first resource server and to display the first resource in a displayable area of the browsing application of the client device;
   receiving, from the client device, an indication of a user interaction with a command interface of the browsing application, the user interaction being indicative of a user's intention to navigate away from the first resource;
   responsive to the indication of the user interaction with the command interface and prior to the user inputting a command into the command interface to navigate away from the first resource:
      parsing, by the server, at least the URL and the title of the first resource to obtain at least one keyword related to the first resource;
      searching, by the server, based on the at least one keyword, an index of structured information, the structured information having been previously indexed from at least one data source, wherein:
         the index of structured information includes at least one entry of structured information having been determined to be relevant to a content of the first resource based on the at least one keyword;
      retrieving, from the index of structured information, at least one entry of structured information based on the at least one keyword, the at least one entry of structured information being associated with a suggested link to the at least one web resource;

generating, by the server, at least one snippet of information based on the at least one retrieved entry of structured information, the at least one snippet of information including the suggested link to the at least one web resource;

the at least one snippet including additional information relevant to the first resource that the user has indicated the intention to navigate away from; and transmitting to the client device the at least one snippet of information for causing the client device to display, in the displayable area of the browsing application of the client device, a start page instead of the first resource, the start page including the at least one snippet of information.

2. The method of claim 1, wherein:

the parsing at least the URL and the title of the first resource to obtain at least one keyword related to the first resource further comprises obtaining at least one alias of the at least one keyword; and the retrieving the indication of structured information based on the at least one keyword is further based on the at least one alias of the at least one keyword.

3. The method of claim 2, wherein:

the at least one entry of structured information is a plurality of entries of structured information, each entry being associated with a respective resource; and the at least one snippet of information is a plurality of snippets of information, each snippet of information based on a respective entry of the plurality of entries of structured information.

4. The method of claim 3, wherein a number of snippets of information transmitted to the client device is predetermined.

5. The method of claim 1, wherein:

the structured information is organized in fields; and the generating the at least one snippet of information further comprises populating fields of the at least one snippet of information using fields of structured information stored in the index.

6. The method of claim 5, wherein the fields of the structured information include at least one of: a company, a place, a product and a media, the media being one of movies, music and games.

7. The method of claim 2, wherein the at least one data source is a plurality of data sources.

8. The method of claim 7, wherein the structured information in the index of structured information has been indexed further based on information available from web resources of the plurality of data sources associated with the first resource.

9. The method of claim 7, wherein the index of structured information has been indexed based on historical information of past users having accessed the first resource.

10. The method of claim 9, wherein the historical information about past users having accessed the first resource comprises click through information, the click through information representative of resources selected by the past users in response to search queries submitted to a search engine by the past users.

11. The method of claim 1, wherein the indication of the user interaction with the browser application is a user selection of an entry field of the browsing application.

12. The method of claim 1, wherein the user interaction with the entry field of the browser application is the entry field obtaining focus when a location of a pointer coincides with the entry field.

13. A server comprising:

a communication interface for communication, via a communication network, with a client device associated with a user;

a non-transitory memory storage storing an index of structured information;

a processor operationally connected with the communication interface and the non-transitory memory storage, the processor being configured to:

receive, from the client device, a request for displaying a first resource in the browser application of the client device, the request including an indication of the first resource, the indication including at least a Uniform Resource Locator (URL) of the first resource and a title of the first resource, the request having been destined to a first resource server hosting the first resource, the request causing the client device to receive the first resource from the first resource server and to display the first resource in a displayable area of the browsing application of the client device;

receive, from the client device, an indication of a user interaction with a command interface of the browsing application, the user interaction being indicative of a user's intention to navigate away from the first resource;

responsive to the indication of the user interaction with the command interface and prior to the user inputting a command into the command interface to navigate away from the first resource:

parse at least the URL and the title of the first resource to obtain at least one keyword related to the first resource;

search based on the at least one keyword, the index of structured information, the structured information having been previously indexed from at least one data source, wherein:

the index of structured information includes at least one entry of structured information having been determined to be relevant to a content of the first resource based on the at least one keyword;

retrieve, from the index of structured information, at least one entry of structured information based on the at least one keyword, the at least one entry of structured information being associated with a suggested link to the at least one web resource;

generate at least one snippet of information based on the at least one retrieved entry of structured information, the at least one snippet of information including the suggested link to the at least one web resource;

the at least one snippet including additional information relevant to the first resource that the user has indicated the intention to navigate away from; and transmit to the client device the at least one snippet of information for causing the client device to display, in the displayable area of the browsing application of the client device, a start page instead of the first resource, the start page including the at least one snippet of information.

14. The server of claim 13, wherein the processor configured to parse at least the URL and the title of the first resource to obtain at least one keyword related to the first resource is further configured to:
   obtain at least one alias of the at least one keyword; and
   retrieve the indication of structured information based on the at least one alias of the at least one keyword.

15. The server of claim 13, wherein the processor configured to generate at least one snippet of information is further configured to populate fields of the at least one snippet of information using fields of structured information stored in the index.

16. The server of claim 13 being further configured to maintain, in the non-transitory memory storage, historical information of past users having accessed the first resource.

17. The server of claim 16, wherein the historical information about past users having accessed the first resource comprises click through information, and the processor is further configured to analyze the click through information to determine resources selected by the past users in response to search queries submitted to a search engine by the past users.

18. The server of claim 17, wherein the processor, for determining resources selected by the past users in response to search queries submitted to a search engine by the past users, is configured to use a Machine-Learning Algorithm (MLA).

* * * * *